United States Patent [19]
Lee et al.

[11] Patent Number: 5,174,693
[45] Date of Patent: Dec. 29, 1992

[54] DRILLING JIG

[75] Inventors: Robin C. Lee; Leonard G. Lee, both of Ottawa; Francis A. McLean, Oxford Station, all of Canada

[73] Assignee: Lee Valley Tools Ltd., Ottawa, Canada

[21] Appl. No.: 744,883

[22] Filed: Aug. 14, 1991

Related U.S. Application Data

[63] Continuation-in-part of Ser. No. 590,667, Sep. 28, 1990, Pat. No. 5,056,966.

[51] Int. Cl.⁵ .............................................. B23B 49/00
[52] U.S. Cl. .................................. 408/108; 408/115 R
[58] Field of Search ................. 408/97, 103, 108, 109, 408/115 R

[56] References Cited

U.S. PATENT DOCUMENTS

| 2,602,238 | 7/1952 | Wellman | 408/108 |
| 4,474,514 | 10/1984 | Jensen | |
| 4,923,340 | 5/1990 | Hegedusch | 408/115 R |
| 4,952,101 | 8/1990 | Coombs | |
| 5,056,966 | 10/1991 | Lee | 408/115 R |

FOREIGN PATENT DOCUMENTS

| 0050210 | 4/1982 | European Pat. Off. | |
| 2142164 | 3/1973 | Fed. Rep. of Germany | 408/103 |
| 2750806 | 5/1979 | Fed. Rep. of Germany | 408/97 |
| 2912605 | 10/1980 | Fed. Rep. of Germany | |
| 433314 | 4/1948 | Italy | |

OTHER PUBLICATIONS

Article from Nov./Dec. 1987 issue of *Fine Woodworking*, entitled "Thirty-Two-Millimeter Cabinets".
Article from Sep. 1987 issue of *Wood & Wood Products* entitled "32 mm System Making Waves in U.S. Cabinet Industry".
Article from Jan. 1988 issue of *Wood & Wood Products* entitled "Part One: Principles of the 32 mm System".
Article from Feb. 1988 issue of *Wood & Wood Products* entitled "Part Two: Basic Elements for 32 mm Layout".
Article from Mar. 1988 issue of *Wood & Wood Products* entitled "Part Three: The Ideal of Balanced 32 mm Panel Concept".
Article from Apr. 1988 issue of *Wood & Wood Products* entitled "Part Four: Layout of the 32 mm Drawer Bank".
Page 16 of House of Tools Fall/Winter 1990 Catalog.
Page 2.99 from Hafele Company's Jul. 1988 catalog.
Page 3.3 from Hafele Company's Jul. 1988 catalog.
Page 71 from Hettich Company's 1988 catalog.
Page 72 from Hettich Company's 1988 catalog.
Page 64 from ELU Company's 1991 catalog.
Page 86 of Woodcraft Company's fall 1990 catalog.
Page 17 from Woodworker's Supply of New Mexico's Oct. 1990 catalog.
Page 85 from Woodworker's Supply of New Mexico's Oct. 1990 catalog.
Page 13 from Woodworker's Supply of New Mexico's Feb. 1990 catalog.

*Primary Examiner*—Daniel W. Howell
*Attorney, Agent, or Firm*—Kilpatrick & Cody

[57] ABSTRACT

A jig for drilling all the dowel and fixture mounting holes for the 32 mm system of cabinet construction consisting of a pair of parallel rails having face and side, a third rail identical to the two parallel rails and attached perpendicularly to the parallel rails, a saddle which straddles the rails and containing a bushing that fits through the saddle and into the holes of the rails and two asymmetric clamping frames having a clamping thumbscrew and a locating thumbscrew with a thread cut on a 1 mm pitch that rigidly attaches to one of the rails.

10 Claims, 5 Drawing Sheets

DRILLING JIG

This application is a continuation-in-part application of Ser. No. 07/590,667 filed Sep. 28, 1990, entitled "Drilling Jig," now U.S. Pat. No. 5,056,966.

BACKGROUND OF THE INVENTION

The present invention relates to the 32 millimeter ("mm") cabinetmaking system, which is a highly structured approach to cabinet construction. The 32 mm system is used primarily in constructing kitchen cabinets and is often referred to as frameless construction due to the absence of a traditional face-frame. The system was developed in Europe as a means to mass produce cabinet components in a factory using melamine-coated particle board and other man-made sheet materials like plywood, ship the components disassembled to the construction site, and assemble the cabinets on-site with ease. The structural rigidity of cabinets made with the 32 mm system results from the very narrow tolerances maintained in panel size and dowel and fixture mounting hole location.

By virtue of the sheer number of holes required for the typical 32 mm system cabinet and the dependence of the structural integrity of the cabinet on the accuracy of the placement of dowel holes, the 32 mm system does not lend itself well to being utilized where hand drilling is the only drilling method available. Large cabinetmaking shops often use expensive computer numerically controlled ("CNC") machines to cut and drill cabinet panels at phenomenal speeds. However, the cost of reprogramming CNC machines and the resulting downtime is prohibitive in small volume production.

An alternative is less expensive pneumatically controlled machines. The set-up time for a pneumatically controlled machine, although a fraction of what its CNC counterpart requires, still represents a substantial amount of time and is prohibitive in producing cabinets in small volumes, is still too expensive for a small shop producing low volume, custom cabinets, and is simply out of the question for the industrious homeowner willing to tackle the manufacture of his or her own kitchen cabinets.

A final alternative is to hand drill all holes. This option is inexpensive and requires virtually zero set-up time. However, because of the accuracy needed in the 32 mm system, hand drilling is not a viable alternative unless some sort of jig is used. Such jigs exist, but do little more than facilitate the drilling of one row of fixture mounting holes at a time, at specific intervals apart, on the face of the panel a set distance from the edge. Existing jigs do not have all of the features necessary to complete every aspect of the 32 mm system, such as providing a means to accurately drill the dowel holes in the ends and edges of a panel.

SUMMARY OF THE INVENTION

The present invention is a device for accurately drilling all the holes necessary in constructing cabinets using the 32 mm system. The 32 mm system jig of the present invention is a simple, inexpensive device which can be easily assembled and used by the small cabinet shop owner or the homeowner.

The jig uses three rails with holes spaced 32 mm apart on their faces and which can be rigidly attached to each other. In use, two of the rails are fixed parallel to one another and centered on the side panel of the cabinet being constructed. The third rail is then attached perpendicular to the other two rails, and the entire assembly is clamped in position. Once clamped, the rails are used in conjunction with a saddle or drill guide to accurately position fixture mounting holes and dowel holes drilled at needed locations in the face of the panel.

In a first embodiment, the third rail is then detached from the two parallel rails and located on the edge of the mating panel using two centering block assemblies to center the rail on the edge of the panel and a gauge assembly to properly locate the rail lengthwise. The saddle or drill guide is used to properly position and center dowel holes drilled in the panel edge.

In a second embodiment, the third rail is then detached from the two parallel rails and located on the edge of the mating panel using two asymmetric clamping frames to locate the rail side-to-side on the edge of the panel and a gauge assembly to properly locate the rail lengthwise. The saddle or drill guide is again used to properly position and center dowel holes drilled in the panel edge.

The present invention allows for the accurate hand drilling of all the dowel and fixture mounting holes necessary in the 32 mm system, is easily and quickly disassembled and reassembled, can be quickly adapted to a wide variety of cabinet designs, and is easily affordable by the small shop owner or homeowner.

Accordingly, one objective of the present invention is to provide a device that permits accurate hand drilling of all the dowel and fixture mounting holes for the 32 mm system of cabinetmaking.

Another objective of the present invention is to provide an inexpensive device for accurately hand drilling all the dowel and fixture mounting holes for the 32 mm system of cabinetmaking.

A further objective of the present invention is to provide a device for accurately hand drilling all the dowel and fixture mounting holes for the 32 mm system of cabinetmaking that is easily and quickly set-up.

Another objective of the present invention is to provide a device that is easily and quickly adaptable to a wide variety of 32 mm system cabinet designs.

Another objective of the present invention is to provide a device which permits properly positioned and centered dowel and fixture mounting holes to be hand drilled in the edges of a panel.

Still another objective of the present invention is to provide a device for accurately hand drilling all the dowel and fixture mounting holes for the 32 mm system of cabinetmaking that is suitable for a low volume cabinetmaking shop or a homeowner.

Other and further objectives of the present invention will become apparent from the detailed description and claims which follow.

DETAILED DESCRIPTION OF THE DRAWINGS

Figure 1:
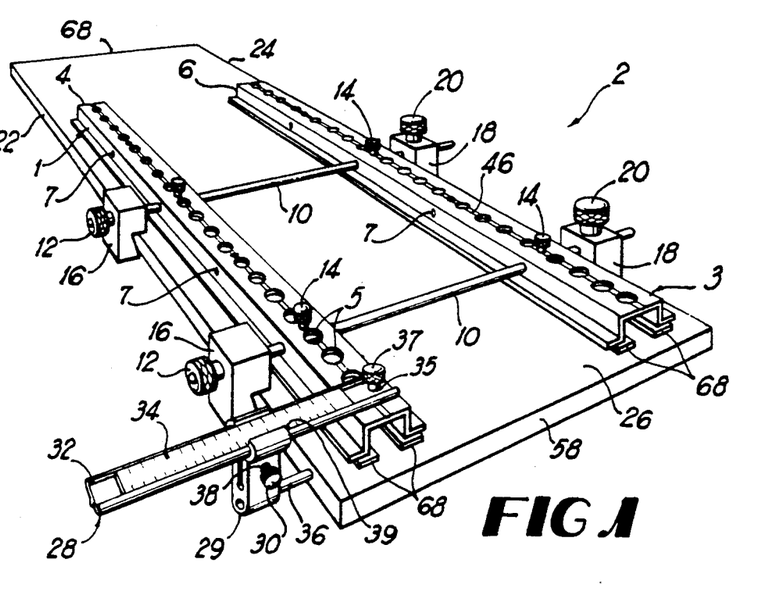
FIG. 1 is a perspective view of the parallel rails of the present invention positioned on a panel to be drilled.
Figure 2:
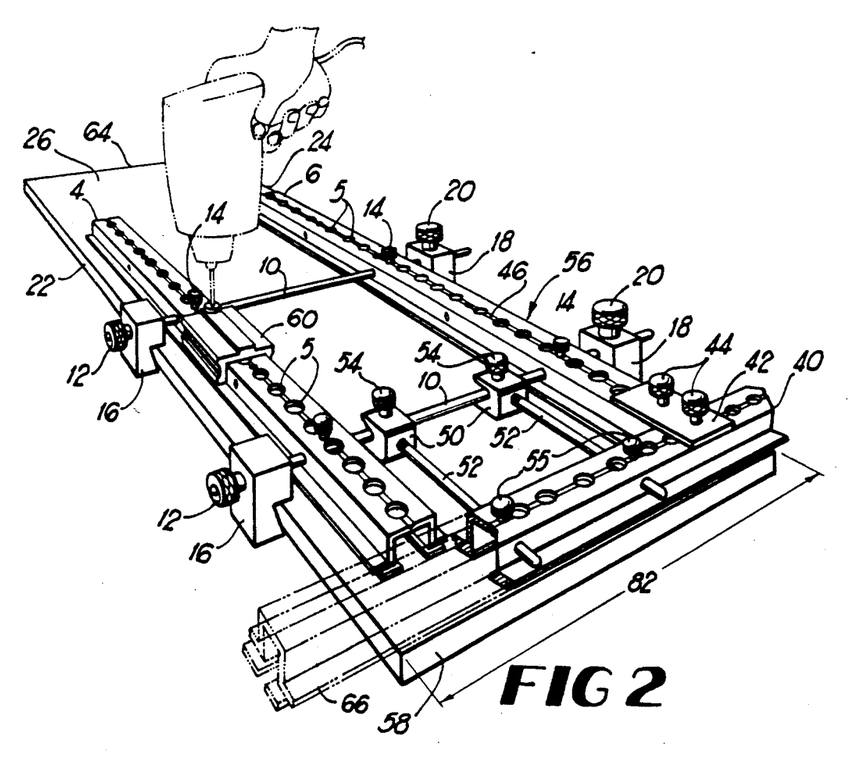
FIG. 2 is a perspective view of the present invention similar to FIG. 1 with the third rail shown partially in phantom attached to the parallel rails.

The drilling jig 2 of the present invention, as illustrated in FIGS. 1 and 2, permits drilling two parallel rows of holes spaced at the 32 mm intervals necessary in 32 mm systemstyle construction. This is accomplished by positioning a first rail 4 and a second rail 6 at desired distances from the side edges 22 and 24, respectively, of panel 26 and fixing rails 4 and 6 in place with clamping means 8. Each rail 4 and 6 may be fabricated of extruded aluminum and resembles a hat channel (as used, for example, in metal roofing) with holes 5 centered side-to-side in the top 3 on 32 mm centers end-to-end (or at other desired intervals such as one inch) and contains a cove or groove 46 on top 3 running the length of rail 4 and 6.

Each clamping means 8 includes at least one clamping rod 10, which is threaded on one end 9. Clamping rod 10 can be made of any suitable material, but cold-rolled steel is preferred. Clamping rod 10 slides through a second set of holes 7 in the sides 1 of rails 4 and 6, the axis of holes 7 being perpendicular to the end-to-end centerline of holes 5, and through a hole 17 in fixed jaw 18. Fixed jaw 18 is a generally rectangular block, preferably made of aluminum, and is secured on clamping rod 10 by clamping screw 20, which threads through fixed jaw 18 to bear against clamping rod 10 in hole 17.

The threaded end 9 of clamping rod 10 also slides through holes 7 and through a hole 15 in movable jaw 16, which is generally identical to clamping jaw 18 but does not carry a clamping screw. Movable jaw 16 is secured on clamping rod 10 by clamping nut 12, which has a threaded bore and is screwed onto threaded end 9 of clamping rod 10 to force jaw 16 toward jaw 18 so that panel 26 is captured between the two jaws. Clamping rod 10 is secured to rails 4 and 6 by clamping screws 14, which thread through the tops 3 of rails 4 and 6 and bear against clamping rod 10. Clamping screw 20 and clamping nut 12 are tightened to secure the now connected rails 4 and 6 to panel 26. Clamping nut 12 and clamping screws 14 and 20 are preferably made of brass or other suitable material such as steel or aluminum.

If more than two lines of parallel holes along the longitudinal centerline of panel 26 are desired, additional rails (not shown) can be inserted on clamping rods 10 and secured by additional sets of clamping screws 14 (not shown).

The location of the centerline of holes 5 of rails 4 and 6 relative to side edge 22 or 24 is established through the use of the gauge assembly 28 illustrated in FIG. 1. Gauge assembly 28 is comprised of gauge head 29, which is substantially T-shaped, hollow in the middle, and contains a gauge rod 36 inserted in the front of gauge head 29. The horizontal portion of gauge head 29 slides over ruler holder 32. Ruler holder 32 is secured within gauge head 29 by gauge knob 30 which is screwed onto gauge stud 38. Gauge stud 38 slides through a hole in one side of the vertical member of gauge head 29 and is received into a threaded hole in the opposite side of the vertical member of gauge head 29. Further rotation of gauge knob 30 and gauge stud 38 presses the two vertical members of gauge head 29 together, thereby tightening gauge head 29 around ruler holder 32.

Ruler holder 32 contains a fixed ruler 34 and a hole 35 in one end. Ruler 34 is attached to ruler holder 32 such that the distance from the centerline of hole 35 to the free end of gauge rod 36 is equal to the reading on ruler 34 at point 39 where ruler 34 crosses the front edge of gauge head 29. In use, rule holder 32 is slid within gauge head 29 until point 39 of gauge head 29 crosses ruler 34 at the desired measurement. Gauge knob 30 is then tightened, preventing further movement of gauge head 29. Gauge button 37 is then inserted through hole 35 and into one of the holes 5 near the end of rail 4. Gauge rod 36 is then placed in contact with edge 22 of panel 26, thereby locating that end of rail 4 with the centerline of holes 5 at the desired distance from edge 22. This process, and the tightening of clamping screws 14 to secure rails 4 and 6 on clamping rod 10 is continued sequentially until all four ends of rails 4 and 6 are properly located. While gauge assembly 28 can be made out of any suitable materials, brass, aluminum, or steel are preferred.

Figure 3:
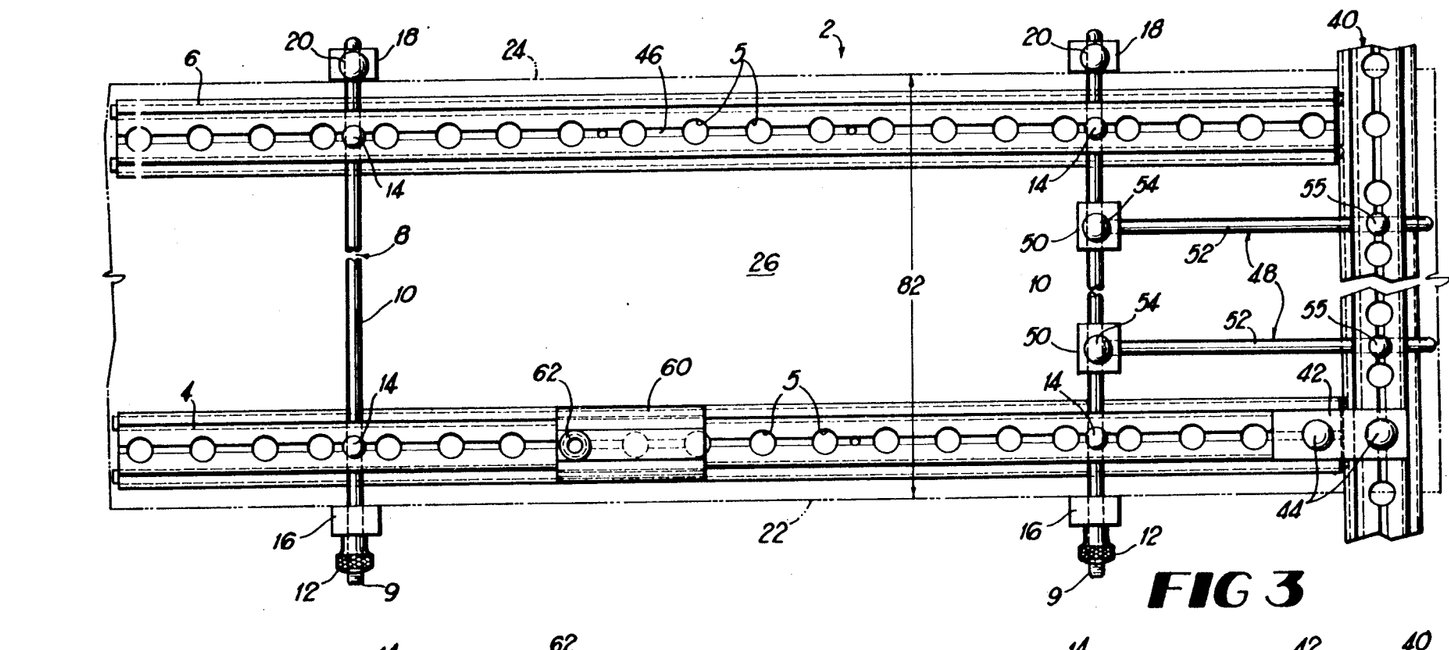
FIG. 3 is a plan view of the three rails of the present invention shown in FIG. 2.
Figure 4:
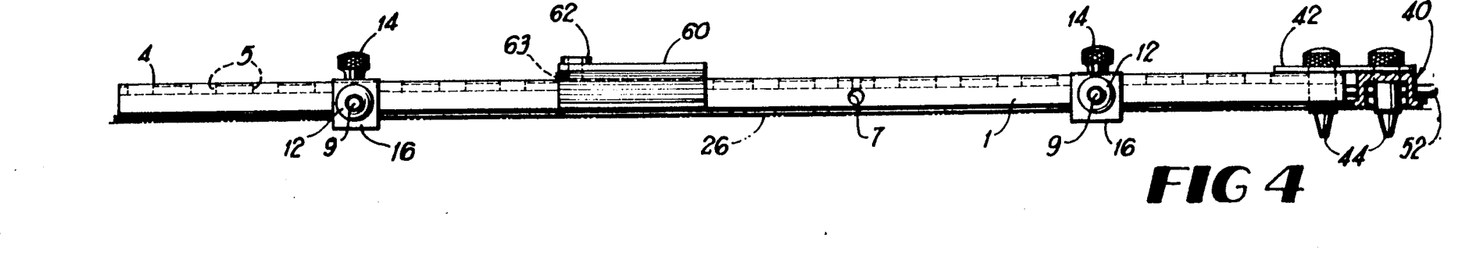
FIG. 4 is an elevation of the three rails of the present invention shown in FIG. 2.
Figure 5:
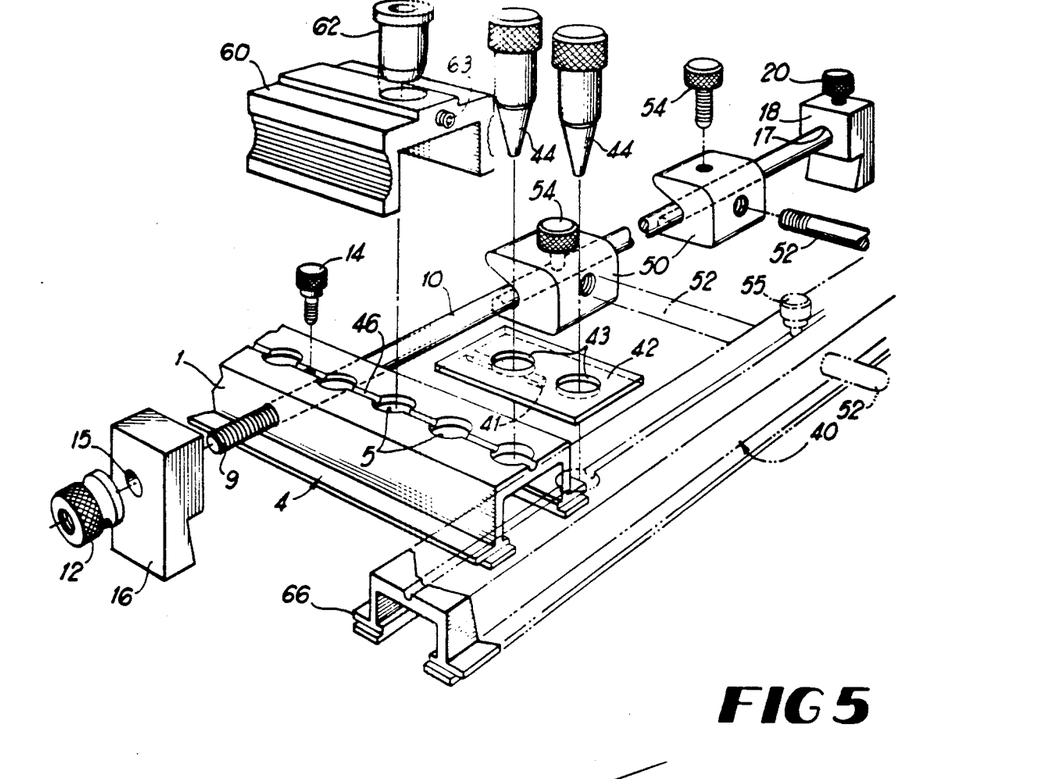
FIG. 5 is a detail view, in perspective, of the connection between the parallel rails and the perpendicular rail of the present invention shown in FIG. 2.

As can be seen in FIGS. 2, 3 and 4, a third rail 40, identical to rails 4 and 6, is then mounted on and perpendicular to the two parallel rails 4 and 6. Rail 40 allows dowel holes to be drilled one half the thickness of mating panel 84 from the ends 58 and 64 of panel 26. These dowel holes match holes in the end of panel 84 to permit panels 84 and 26 to be butt-joined. Rail 40 is located in relation to rails 4 and 6 so that the distance from the centerline of the last hole on each of the two parallel rails 4 and 6, to the centerline of holes on rail 40 is exactly 32 mm. This positioning is accomplished through the use of at least one end rail clamping assembly 48. Each end rail clamping assembly 48 includes one clamping block 50, which contains a channel in which clamping rod 10 is trapped by clamping screw 54 and a threaded bore 51 to receive the threaded end of end clamping rod 52. End rail clamping rod 52 can be made of any suitable material with cold-rolled steel being preferred. Clamping block 50 likewise made be made of steel or brass, but aluminum is preferred. Clamping screws 54 are preferably made of brass, but other suitable materials such as steel or aluminum also can be used.

The threaded end of end rail 52 is first inserted in bore 51 of clamping block 50. The channel of clamping block 50 is then placed over clamping rod 10 and clamping screw 54 is tightened slightly. The smooth end of end clamping rod 52 is then inserted through one pair of holes 7 in the side 1 of rail 40 and loosely secured by clamping screw 55. Once rail 40 has been movably secured to rails 4 and 6 by clamping assembly 48, a connector 42 having a half round locating ridge 41 is installed so that ridge 41 is received in groove 46 in the top 3 of rails 4 or 6. Connector 42 has two holes 43, separated 32 mm on center. Two locating pins 44, are installed next so that locator pins 44 run through holes 43 into the end hole 5 in rail 4 and one of the holes 5 in rail 40. Connector 42 is preferably made of aluminum and locator pins are preferably made of brass, but another suitable material, such as steel, could also be used. Groove 46 on rail 4 receives ridge 41 on connector 42 ensuring that hole 5 in rail 40 which is adjacent to the last hole in rail 4 is in the same end-to-end centerline of holes 5 in rail 4 and that the center of holes 5 in rail 40 is exactly 32 mm from the center of the last hole 5 in rail 4. This process of locating rail 40 by using connector 42 is then repeated on rail 6. Once rail 40 has been properly located, clamping screws 54 and 55 are tightened, ensuring that rail 40 is perpendicular to rails 4 and 6 and that the end-to-end centerline of holes 5 in rail 40 is exactly 32 mm from the end holes 5 in both rails 4 and 6.

Once all the components are locked, the connector 42 and locating pins 44 are removed. This assembly of three rails 4, 6 and 40 forms a rigid U-shape continuum of identically spaced holes. Clamp nuts 12 are loosened and the entire frame 56 is slid toward one end 58 or 64 of panel 26 until the centerline of holes 5 on rail 40 is one half the thickness of panel 84 from end 58 or 64 of panel 26. This distance may be measured by use of gauge assembly 28 in a manner similar to that described above. Once frame 56 is in position, clamp nuts 12 are retightened.

With rails 4, 6 and 40 properly located, panel 26 can be drilled. The drilling of panel 26 is facilitated by bushing carrier, or saddle 60, which fits over and straddles the rails 4, 6, and 40 and has a hole centered therein for receiving interchangeable bushing 62. Bushing 62, which acts as a guide and ensures the dowel and fixture mounting holes are drilled perpendicular to the face of panel 26, is locked into the bushing carrier 60 by a setscrew 63, and has an outside diameter allowing a precise slip fit into holes 5 in the top of the rails. To prevent excessive wear, bushing 62 is preferably made of hardened steel, but other materials may be used. Bushing carrier 60, which may be made of aluminum, is placed with bushing 62 located in a hole 5 in the rails and the hole drilled. Bushing carrier 60 is then raised slightly and moved to the next hole along rails 4, 6 and 40 as the desired holes are chain drilled. The interchangeability of bushing 62 permits drilling of different size holes. For example, the holes drilled in connection with parallel rails 4 and 6 are generally 5 mm, the normal size used for shelf supports and other mounting hardware. In contrast, dowel holes drilled in connection with rail 40 are generally drilled 8 mm in diameter.

To drill the dowel holes on the end opposite to end 58 or end 64 (depending on which end was drilled first), frame 56 is unclamped from panel 26 by loosening clamp nuts 12 and frame 56 is rotated 180°. Gauge assembly 28 is used to locate frame 56 so that the centerline of the row of holes in third rail 40 is one half of the thickness of panel 84 from panel end 58 or 64 in the manner described above. As can be seen in FIGS. 1 and 2, while rotating frame 56, rail 40 does not drop down due to lip 66 on the edges of rail 40, resting on the ledges 68 on the ends of parallel rails 4 and 6.

In the alternative, an additional rail (not shown) could also be attached to rails 4 and 6 opposite to and in the same manner as rail 40 by using a second end rail clamping assembly 48 (not shown).

If panel 26 is longer than rails 4 and 6, a gap without holes will remain in the middle of panel 26. Jig 2 can be repositioned to drill holes in this gap by loosening clamp nuts 12 and sliding frame 56 so that rails 4 and 6 overlap the holes already drilled in each end 58 and 64 of panel 26. Rails 4 and 6 are located by inserting a locating pin 44 through one hole 5 in the top 3 of either rail 4 or 6 and then through one of the previously drilled holes. This ensures the holes drilled in the gap will all be at 32 mm intervals with the previously drilled holes. Once frame 56 is properly located, clamp nuts 12 are tightened, locator pin 44 removed, and the remaining holes are drilled in the gap.

As can be seen in FIGS. 6, 7, 8 and 9, dowelling jig 69 is used to drill the dowel holes in the edges of panel 84. In a first embodiment illustrated in FIG. 6, dowelling jig 69 uses one rail 4, 6 or 40, the bushing carrier 60, bushing 62, and a pair of centering block assemblies 70. Each centering block assembly consists of a centering bar 72, having two sets of holes into which a pair of protruding centering pins 74 can be inserted. Centering guide stud 76, which is threaded on both ends, is screwed into a hole in the center of bar 72 on the side opposite from centering pins 74. Bar 72, centering guide stud 76 and centering pins 74 are preferably made of steel but other materials such as aluminum may also be used.

Figure 6:
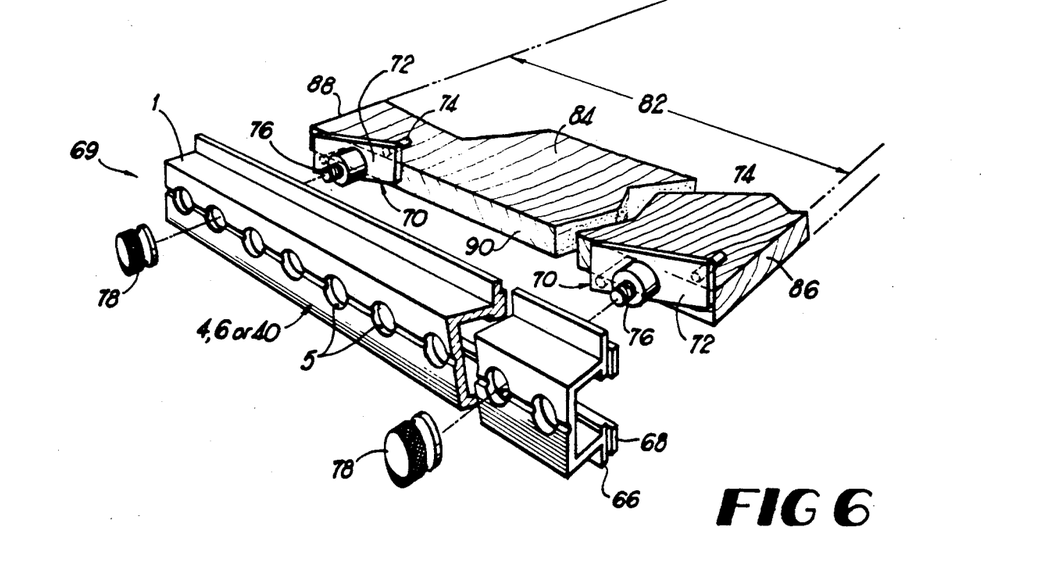
FIG. 6 is a perspective view of the first embodiment of the edge drilling jig of the present invention positioned to drill dowel holes in the edge of a panel.

In use, a pair of centering block assemblies 70 are placed with studs 76 inserted into two holes in any of rails 4, 6 or 40, spaced apart a distance slightly less than width 82 of panel 84. With rail 4 positioned against the edge of panel 84, block assemblies 70 are rotated clockwise until pins 74 register against the top and bottom face of panel 84. This aligns rail 4 with the centerline of edge 90 of panel 84. Centering guide knobs 78 are then tightened on the free ends of centering guide studs 76 to lock block assemblies 70 in place. The clockwise turning effect of tightening guide knobs 78 on the block assemblies 70 ensures pins 74 maintain intimate contact with the faces of panel 84. Gauge assembly 28 is inserted into the last hole of one end of rail 4 and adjusted as described above so that the distance from the edge 86 or 88 to the first hole drilled in the edge 90 of panel 84 will be exactly the same as the distance from panel 26 edge 24 to the last transverse hole drilled with rail 40. This is accomplished by sliding rail 4 along edge 90 of panel 84 until the gauge rod 36 of the gauge assembly 28 engages edge 86 or 88 of panel 84. The dowel holes, typically 8 mm, may now be drilled using bushing carrier 60 and bushing 62. Only the matching dowel holes drilled at the ends of panel 26 with rail 40 need to be drilled. The first hole drilled is preferably opposite the gauge assembly. Once this hole is drilled, locator pin 44 can be inserted through hole 5 in top 3 of rail 4 and then through the hole in the edge of panel 84. Locator pin 44 prevents rail 4 from sliding on edge 90 of panel 84 and gauge assembly 28 can be removed before the remaining holes are drilled.

Figure 7:
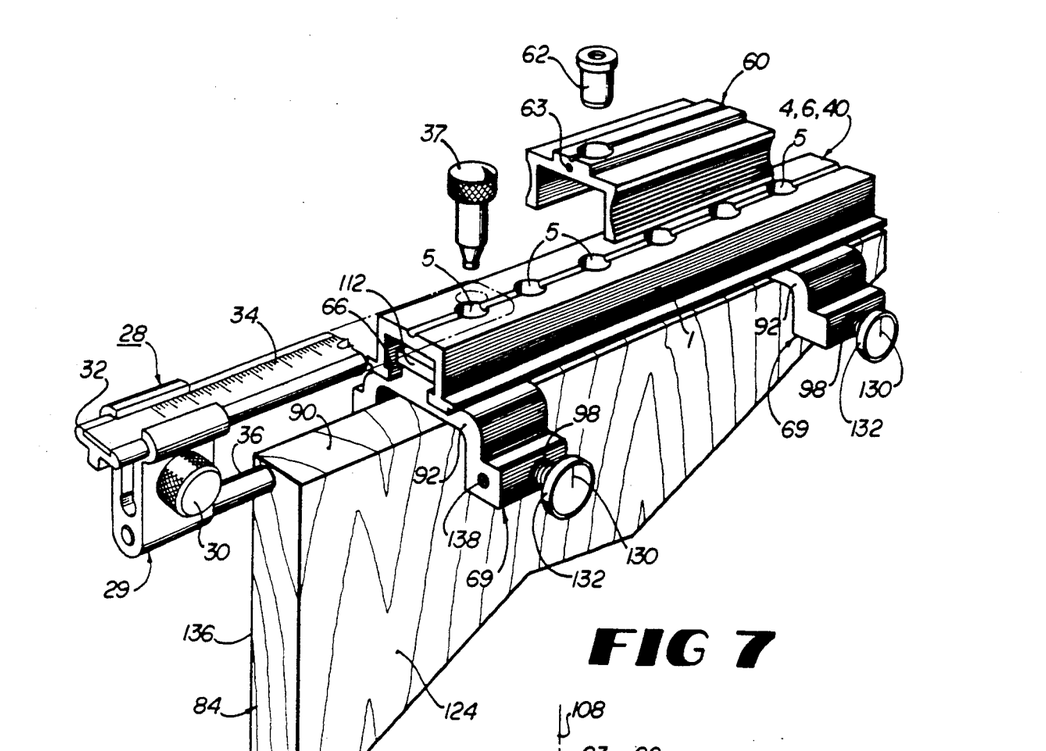
FIG. 7 is an exploded perspective view of the second embodiment of the edge drilling jig of the present invention installed on a rail and positioned to drill dowel holes in the edge of a panel.
Figure 8:
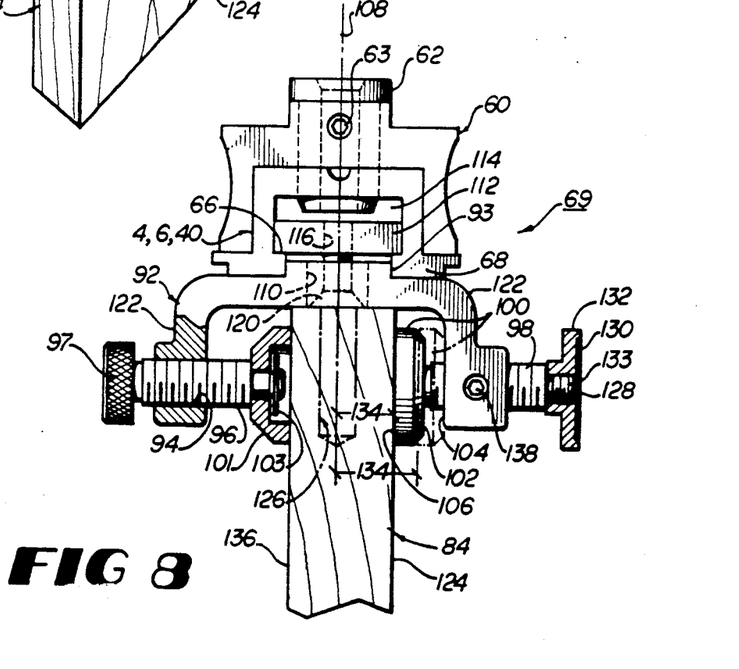
FIG. 8 is an elevational view of the edge drilling jig illustrated in FIG. 7 looking widthwise down the edge of a panel and showing the jig in partial cross section.
Figure 9:
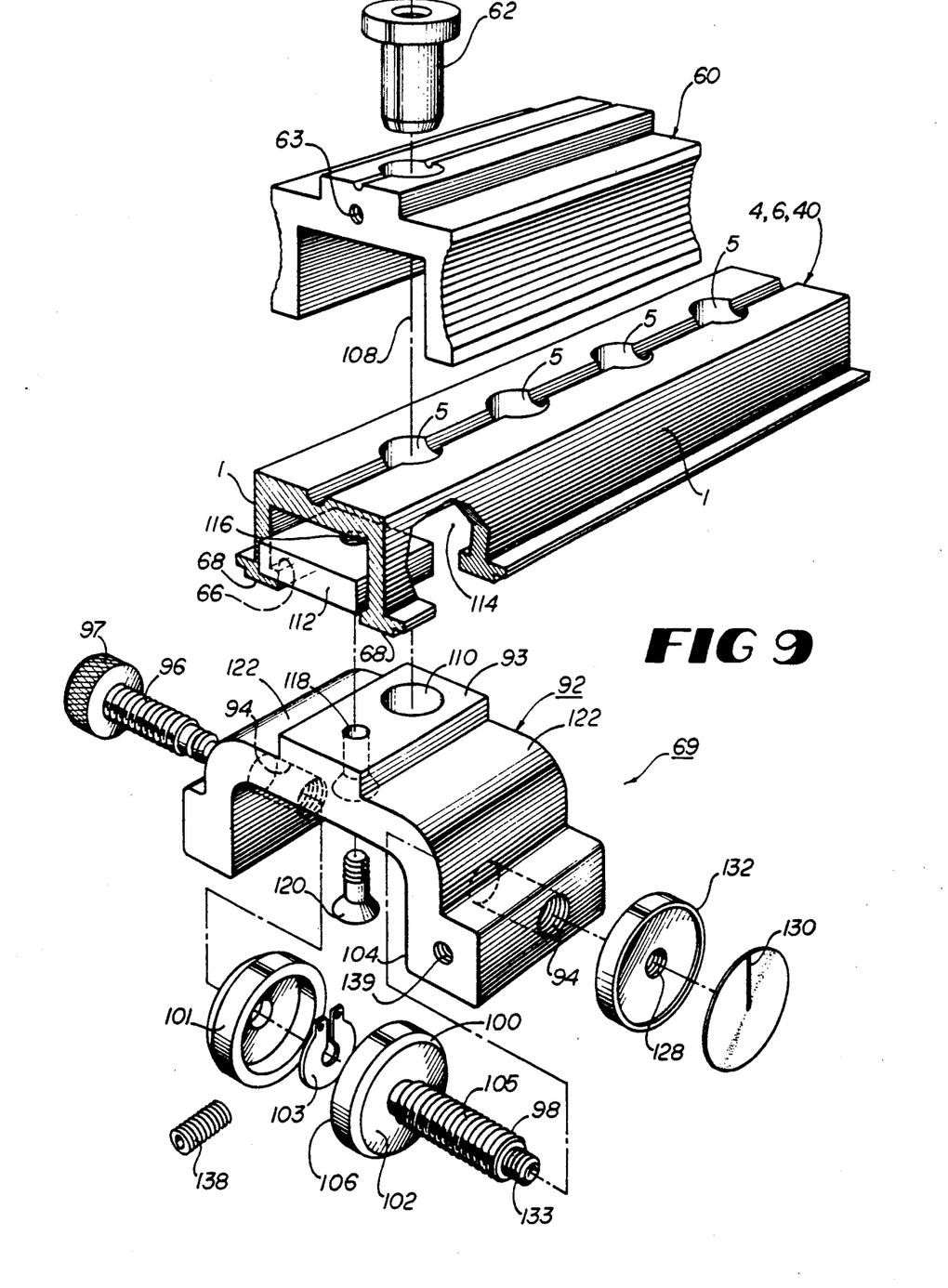
FIG. 9 is an enlarged, exploded perspective view of the edge drilling jig illustrated in FIG. 7.

In a second embodiment illustrated in FIGS. 7, 8 and 9, dowelling jig 69 uses one rail 4, 6 or 40, the bushing carrier 60, bushing 62, and a pair of asymmetric, generally U-shaped clamping frames 92 having an upstanding projection 93. Frame 92 is preferably made of steel, aluminum or aluminum alloy and contains threaded holes 94 which receive clamping thumbscrew 96 and locating thumbscrew 98. Clamping thumbscrew 96 contains an integral head 97 and a rotatable clamping foot 101 that helps prevent marring of panel 84 and is retained on clamping thumbscrew 96 by spring clip 103. Locating thumbscrew 98 contains integrally molded foot 100, a removable head 132 having a threaded hole 128 that is screwed onto threaded, reduced end 133 of locating screw 98 opposite foot 100 and thread 105 cut on a specific pitch, for example 1 mm. Thumbscrews 96 and 98, feet 100 and 101 and heads 97 and 133 are preferably made of brass but other suitable materials such as steel or stainless steel may also be used. The dimensions of frame 92 and the thickness of foot 100 are such that when locating thumbscrew 98 is counter-rotated in hole 94 until the inside face 102 of foot 100 contacts the inside edge 104 of frame 92, the setback 134 from the outside face 106 of foot 100 to the centerline 108 of hole 110 in projection 93 is a desired amount, for example, 13 mm.

In use, projection 93 on frame 92 is slid between sides 1 of rail 4, 6 or 40 until hole 110 aligns with a selected hole 5 in rail 4, 6 or 40. Nut 112 is placed on the inside 114 of rail 4, 6 or 40 on lip 66 so that threaded hole 116 on nut 112 aligns with smooth, countersunk hole 118 in projection 93. Screw 120 is journaled through hole 118, screwed into hole 116 and tightened so that shoulders 122 on frame 92 rigidly contact ledges 68 on rail 4, 6 or 40 and nut 112 rigidly contacts lip 66, as can be seen in FIG. 8, thereby preventing further movement of frame 92 along rail 4, 6 or 40.

Once frame 92 is rigidly attached to rail 4, 6 or 40, locating thumbscrew 98 is counter-rotated out of hole 94 until inside face 102 of foot 100 contacts inside 104 of frame 92 and frame 92 is placed on panel 84 so that outside face 106 of foot 100 contacts face 124 of panel 84. Because setback 134 is a known distance and thread 105 on locating thumbscrew 98 is cut on a known pitch (for example, 1 mm), each rotation of locating thumbscrew 98, as evidenced by mark 130 on head 132, reduces setback 134 by 1 mm. For example, if setback 134 is 13 mm when locating thumbscrew 98 is counter-rotated out of hole 94 until inside 102 of foot 100 contacts inside 104 of frame 92, three rotations of head 132 will reduce setback 134 to 10 mm resulting in hole 126 in edge 90 being drilled 10 mm away from face 124 of panel B4. It will be readily apparent in the above example that setback 134 can be varied from zero to thirteen millimeters either continuously or at any desired interval by appropriate rotation of head 132.

Once setback 134 has been adjusted as described above to the appropriate distance, locating thumbscrew 98 is held in the selected position by tightening setscrew 138 in hole 139 Setscrew 138 is preferably nylon or other relatively soft material that will not damage thread 105 of locating thumbscrew 98. Rail 4, 6 or 40 is placed with frame 92 straddling edge 90 of panel 84 and located along edge 90 by gauge assembly 28 in substantially the same manner described above. Frame 92 and rail 4, 6 or 40 are prevented from further movement along edge 90 by rotating clamping thumbscrew 96 until foot 101 contacts face 136 of panel 84. Holes 126 can now be drilled using bushing carrier 60 and bushing 62 in the same manner described above.

This description is given for purposes of illustration and explanation. It will be apparent to those skilled in the relevant art that modifications and changes may be made to the invention as described above without departing from its scope or spirit.

I claim:

1. A drilling jig comprising:
   a) a rail having spaced holes;
   b) a drill guide; and
   c) a means for locating and clamping the rail on an edge of a workpiece having a face in various positions along the edge and in various positions along an axis normal to the face of the workpiece.

2. The drilling jig of claim 1 wherein the drill guide comprises a saddle to straddle a rail and a removable bushing which extends through the saddle and may be received in a hole in the rail.

3. The drilling jig of claim 1 wherein the locating and clamping means comprises:
   a) at least one generally U-shaped frame having two sides;
   b) a thumbscrew having a mark received in one side of the frame;
   c) a clamping screw received in the side of the frame opposite the thumbscrew; and
   d) a means for fixing the frame to the rail.

4. The drilling jig of claim 3 wherein the thumbscrew has a thread cut on a one millimeter pitch.

5. The drilling jig of claim 3 wherein the fixing means comprises a nut received in the rail and a screw extending through the frame and into the nut.

6. The drilling jig of claim 1 wherein the various positions along an axis normal to the face of the workpiece are predetermined, incrementally separated positions.

7. A drill jig comprising:
   a) a rail having spaced holes;
   b) a drill guide comprising a saddle to straddle the rail and a removable bushing which extends through the saddle and may be received in a hole in the rail; and
   c) a means for locating and clamping the rail on an edge of a workpiece having a face in various positions along the edge and in various positions along an axis normal to the face of the workpiece.

8. A drilling jig comprising:
   a) a rail having spaced holes;
   b) a drill guide; and
   c) a means for locating and clamping the rail on an edge of a workpiece having a face in various positions along the edge and in various positions along an axis normal to the face of the workpiece comprising:
      i) at least one generally U-shaped frame having two sides;
      ii) a thumbscrew having a mark received in one side of the frame;
      iii) a clamping screw received in the side of the frame opposite the thumbscrew; and
      iv) a means for fixing the frame to the rail.

9. The drilling jig of claim 8 wherein the thumbscrew has a thread cut on a one millimeter pitch.

10. The drilling jig of claim 8 wherein the fixing means comprises a nut received in the rail and a screw extending through the frame and into the nut.

* * * * *

UNITED STATES PATENT AND TRADEMARK OFFICE
CERTIFICATE OF CORRECTION

PATENT NO. : 5,174,693
DATED : December 29, 1992
INVENTOR(S) : Robin C. Lee, Leonard G. Lee, Francis A. McLean It is certified that error appears in the above-identified patent and that said Letters Patent is hereby corrected as shown below:

Column 7, line 37, delete "B4" and insert --84--

Signed and Sealed this

Thirtieth Day of November, 1993

Attest:

BRUCE LEHMAN

Attesting Officer

Commissioner of Patents and Trademarks